(12) United States Patent
Goldberg et al.

(10) Patent No.: US 10,803,460 B2
(45) Date of Patent: Oct. 13, 2020

(54) INDEX OF USABILITY FOR A REPLACEMENT PAYMENT CARD

(71) Applicant: INTERNATIONAL BUSINESS MACHINES CORPORATION, Armonk, NY (US)

(72) Inventors: Itzhack Goldberg, Hadera (IL); Rick A. Hamilton, II, Charlottesville, VA (US); Shawn P. Mullen, Buda, TX (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 15/209,818

(22) Filed: Jul. 14, 2016

(65) Prior Publication Data

US 2018/0018669 A1   Jan. 18, 2018

(51) Int. Cl.
| | |
|---|---|
| *G06Q 20/40* | (2012.01) |
| *G06Q 20/34* | (2012.01) |
| *G06F 16/22* | (2019.01) |
| *G06Q 20/10* | (2012.01) |

(52) U.S. Cl.
CPC ..... *G06Q 20/4016* (2013.01); *G06F 16/2228* (2019.01); *G06Q 20/1085* (2013.01); *G06Q 20/34* (2013.01); *G06Q 20/405* (2013.01)

(58) Field of Classification Search
CPC .................................................. G06Q 20/34
See application file for complete search history.

(56) References Cited

U.S. PATENT DOCUMENTS

| | | |
|---|---|---|
| 5,841,118 A | 11/1998 | East |
| 7,280,645 B1 | 10/2007 | Allen et al. |
| 7,581,674 B2 | 9/2009 | Cohen et al. |

(Continued)

FOREIGN PATENT DOCUMENTS

| | | | |
|---|---|---|---|
| DE | 19653068 A1 | * | 6/1997 |
| GB | 2525099 A | | 10/2015 |
| WO | 0054195 A1 | | 9/2000 |

OTHER PUBLICATIONS

Edward A. Morse & Vasant Raval, "Private Ordering in Light of the Law: Achieving Consumer Protection Through Payment Card Security Measures," DePaul Business & Commercial Law Journal, vol. 10, Issue 213, pp. 213-265 (2012).*

(Continued)

*Primary Examiner* — Virpi H Kanervo
(74) *Attorney, Agent, or Firm* — Michael O'Keefe (57) ABSTRACT

A method for establishing an index of usability associated with a replacement payment card is provided. The method may include receiving a payment card replacement request in a vending facility. The method may further include identifying at least one possible risk factor associated with a user utilizing the replacement payment card. The method may also include creating a risk assessment based on the at least one identified possible risk factor. The method may further include establishing an index of usability for the replacement payment card based on the created assessment, whereby a value of the index of usability correlates to a plurality of restrictions placed on using the replacement payment card. The method may also include storing the established index of usability in a database.

20 Claims, 8 Drawing Sheets

(56) References Cited

U.S. PATENT DOCUMENTS

| | | |
|---|---|---|
| 8,165,938 B2 | 4/2012 | Monk |
| 2002/0082994 A1 | 6/2002 | Herziger |
| 2005/0065885 A1 | 3/2005 | Gordon |
| 2008/0208747 A1* | 8/2008 | Papismedov .......... G06Q 20/20 705/44 |
| 2009/0299886 A1 | 12/2009 | Newman et al. |
| 2010/0005515 A1 | 1/2010 | Votaw |
| 2011/0125645 A1 | 5/2011 | Benkert et al. |
| 2013/0290195 A1* | 10/2013 | Frazier ............... G06Q 30/0278 705/306 |
| 2014/0156424 A1 | 6/2014 | Simmons |
| 2015/0045118 A1* | 2/2015 | Bishop ................ G07F 17/3227 463/29 |
| 2015/0186605 A1* | 7/2015 | Boustani ............. G06F 3/04817 705/2 |
| 2016/0180329 A1 | 6/2016 | Suberville |
| 2016/0234229 A1* | 8/2016 | Carpenter ........... H04L 63/1433 |
| 2017/0161725 A1* | 6/2017 | Hosp ................... G06Q 20/354 |
| 2017/0344990 A1 | 11/2017 | Kohli |
| 2018/0018656 A1 | 1/2018 | Goldberg et al. |

OTHER PUBLICATIONS

Edward A. Morse & Vasant Raval, "Private Ordering in Light of the Law: Achieving Consumer Protection Through Payment Card Security Measures," DePaul Business & Commercial Law Journal, vol. 10, Issue 213, pp. 213-265 (2012). (Year: 2012).*

Anonymous, "Method to Reduce Security Compromises in Credit Cards," An IP.com Prior Art Database Technical Disclosure, Apr. 4, 2012, p. 1-2, IP.com No. IPCOM000216407D.

Anonymous, "Sharing of Limited Use Credit Authorization Codes on Mobile Devices," An IP.com Prior Art Database Technical Disclosure, Jan. 15, 2016, p. 1-2, IP.com No. IPCOM000244787D.

Mell et al., "The NIST Definition of Cloud Computing," National Institute of Standards and Technology, Sep. 2011, p. 1-3, Special Publication 800-145.

IBM: List of IBM Patents or Patent Applications Treated As Related (Appendix P), Dec. 28, 2018, pp. 1-2.

* cited by examiner

INDEX OF USABILITY FOR A REPLACEMENT PAYMENT CARD

BACKGROUND

The present invention relates, generally, to the field of computing, and more particularly to payment card replacement systems.

A payment card may be an item that allows a user to purchase goods or services through an electronic funds transfer. Typically, a payment card utilizes a magnetic stripe, or a microchip for smart payment cards, to process transactions between the user and a retailer. Additionally, many payment cards include embossed information, such as the cardholder's name, expiration date, and card number conforming to the ISO/IEC 7812 numbering standard. Furthermore, various types of payment cards exist that are distinguishable based on the features each type of payment card provides, such as a credit card, a debit card, a charge card, an automatic teller machine (ATM) card, a store-valued card, a fleet card, or a gift card.

SUMMARY

According to one embodiment, a method for establishing an index of usability associated with a replacement payment card is provided. The method may include receiving a payment card replacement request in a vending facility. The method may further include identifying at least one possible risk factor associated with a user utilizing the replacement payment card. The method may also include creating a risk assessment based on the at least one identified possible risk factor. The method may further include establishing an index of usability for the replacement payment card based on the created assessment, whereby a value of the index of usability correlates to a plurality of restrictions placed on using the replacement payment card. The method may also include storing the established index of usability in a database.

According to another embodiment, a computer system for establishing an index of usability associated with a replacement payment card is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a payment card replacement request in a vending facility. The method may further include identifying at least one possible risk factor associated with a user utilizing the replacement payment card. The method may also include creating a risk assessment based on the at least one identified possible risk factor. The method may further include establishing an index of usability for the replacement payment card based on the created assessment, whereby a value of the index of usability correlates to a plurality of restrictions placed on using the replacement payment card. The method may also include storing the established index of usability in a database.

According to yet another embodiment, a computer program product for establishing an index of usability associated with a replacement payment card is provided. The computer program product may include one or more computer-readable storage devices and program instructions stored on at least one of the one or more tangible storage devices, the program instructions executable by a processor. The computer program product may include program instructions to receive a payment card replacement request in a vending facility. The computer program product may further include program instructions to identify at least one possible risk factor associated with a user utilizing the replacement payment card. The computer program product may also include program instructions to create a risk assessment based on the at least one identified possible risk factor. The computer program product may further include program instructions to establish an index of usability for the replacement payment card based on the created assessment, whereby a value of the index of usability correlates to a plurality of restrictions placed on using the replacement payment card. The computer program product may also include program instructions to store the established index of usability in a database.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention are related to the field of computing, and more particularly to payment card replacement systems. The following described exemplary embodiments provide a system, method, and program product to, among other things, provide an efficient method of replacing a physical payment card to a user. Therefore, the present embodiment has the capacity to improve the technical field of business data processing by implementing an alternate system replacing a physical payment card that is lost, stolen, destroyed, or otherwise unavailable to the user, other than mailing or shipping the replacement payment card to the user.

As previously described, a payment card may be an item that allows a user to purchase goods or services through an electronic funds transfer. Typically, a payment card utilizes a magnetic stripe, or a microchip for smart payment cards, to process transactions between the user and a retailer. Additionally, many payment cards include embossed information, such as the cardholder's name, expiration date, and card number conforming to the ISO/IEC 7812 numbering standard. Furthermore, various types of payment cards exist that are distinguishable based on the features each type of payment card provides, such as a credit card, a debit card, a charge card, an automatic teller machine (ATM) card, a store-valued card, a fleet card, or a gift card.

Due to loss or fraudulent charges, a payment card may occasionally require replacement by an issuing company. Typically, when a payment card is to be replaced, mail or expedited shipping is utilized to deliver a replacement payment card to the affected card owner in a short period of time, such as one to two business days. However, the exact replacement time may be negatively impacted by various circumstances, such as the card owner travelling during the replacement period or weather delays affecting shipping routes. As such, it may be advantageous to, among other things, implement a system that utilizes a vending facility, such as an ATM, to verify a card owner's identity and provide the verified card holder with a replacement payment card.

According to one embodiment, a payment card replacement system may utilize a known two-factor authentication system to validate a card holder's identity. The two-factor authentication system is a process of confirming a card holder's identity through two components, such as through information only the user knows and an item only the user possesses. Common usage of two-factor authentication is seen when an individual withdraws cash from an ATM. In such a situation, the item only the user would possess is the user's payment card and the information only the user would know is the user's pin. Once the identity of the card holder is authenticated, the card holder may be provided with a unique, extended pin number and the location of a nearby vending facility, such as an ATM. The user may input the provided pin number to the ATM, which is enabled to verify the user-entered pin number, link a payment card number associated with a payment card physically stored in the ATM, and dispense the physical payment card. Therefore, the card holder may obtain a temporary or permanent replacement payment card within an efficient period of time that may not be capable through mailing or expedited shipping methods.

The following described exemplary embodiments provide a system, method, and program product that provides a user with a replacement payment card through a vending facility upon validating the user's identity through a two-factor authentication method. Furthermore, the present embodiment may facilitate the real-time dynamic credit value in addition to a temporary card based on wearable technologies placed within a preconfigured proximity to the temporary card.

Figure 1:
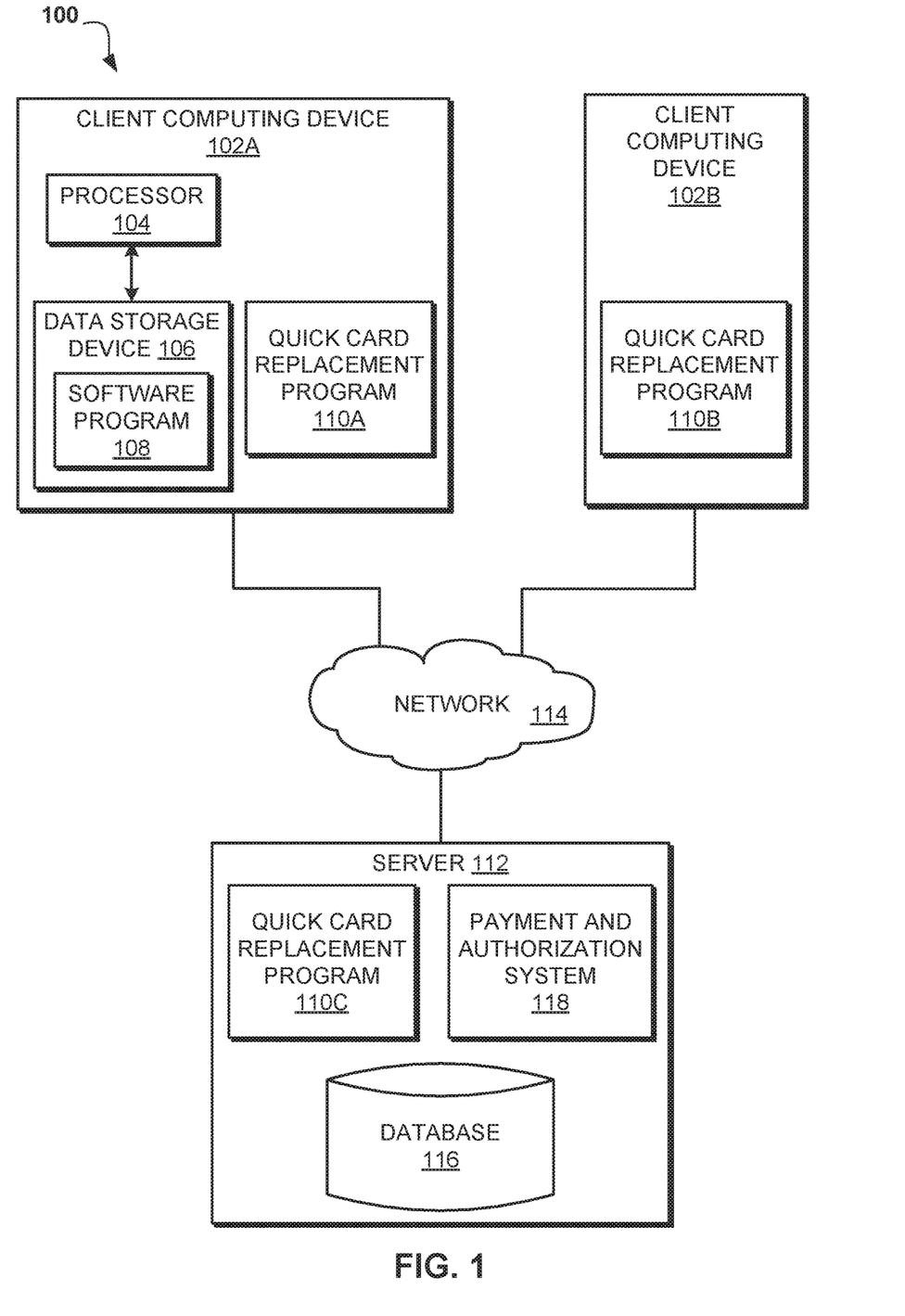
FIG. 1 illustrates an exemplary networked computer environment according to at least one embodiment.

Referring to FIG. 1, an exemplary networked computer environment 100 is depicted, according to at least one embodiment. The networked computer environment 100 may include a client computing device 102A, 102B and a server 112 interconnected via a communication network 114. According to at least one implementation, the networked computer environment 100 may include a plurality of client computing devices 102A, 102B, of which only two are shown for illustrative brevity. According to at least one implementation, the networked computer environment 100 may include a plurality of servers 112, of which only one of which is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 102A may include a processor 104 and a data storage device 106 that is enabled to host and run a software program 108, in accordance with embodiments of the invention. The client computing device 102A, 102B is enabled to host and run a quick card replacement program 110A, 110B and communicate with the server 112 via the communication network 114, in accordance with one embodiment of the invention. The client computing device 102A, 102B may be, for example, a mobile device, a telephone, a personal digital assistant, a netbook, a laptop computer, a tablet computer, a desktop computer, or any type of computing device capable of running a program and accessing a network. Furthermore, the client computing device 102B may be a vending facility capable of storing and dispensing a physical replacement payment card to a user. As will be discussed with reference to FIG. 6, the client computing device 102A, 102B may include internal components 602*a* and external components 604*a*, respectively.

The server computer 112 may be a laptop computer, netbook computer, personal computer (PC), a desktop computer, or any programmable electronic device or any network of programmable electronic devices capable of hosting and running a quick card replacement program 110C, a database 116, and a payment and authorization system 118 and communicating with the client computing device 102A, 102B via the communication network 114, in accordance with embodiments of the invention. As will be discussed with reference to FIG. 6, the server computer 112 may include internal components 602*b* and external components 604*b*, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud. The cloud computing environment will be discussed in further detail below with respect to FIGS. 7 and 8.

According to the present embodiment, the quick card replacement program 110A-C may be a program capable of validating the identity of a user wishing to receive a replacement payment card, locating a vending facility capable of dispensing a physical replacement payment card to the user, assigning data associated with the replacement payment card to an account associated with the requesting user, and dispensing the physical replacement card to the validated user. According to various implementations of the present embodiment, the quick card replacement program 110A, 110B, 110C may interact with the database 116 that may be embedded in various storage devices, such as the client computing device 102A, 102B, a networked server 112, or a cloud storage service. The quick card replacement method is explained in further detail below with respect to FIGS. 2 and 3.

Figure 2:
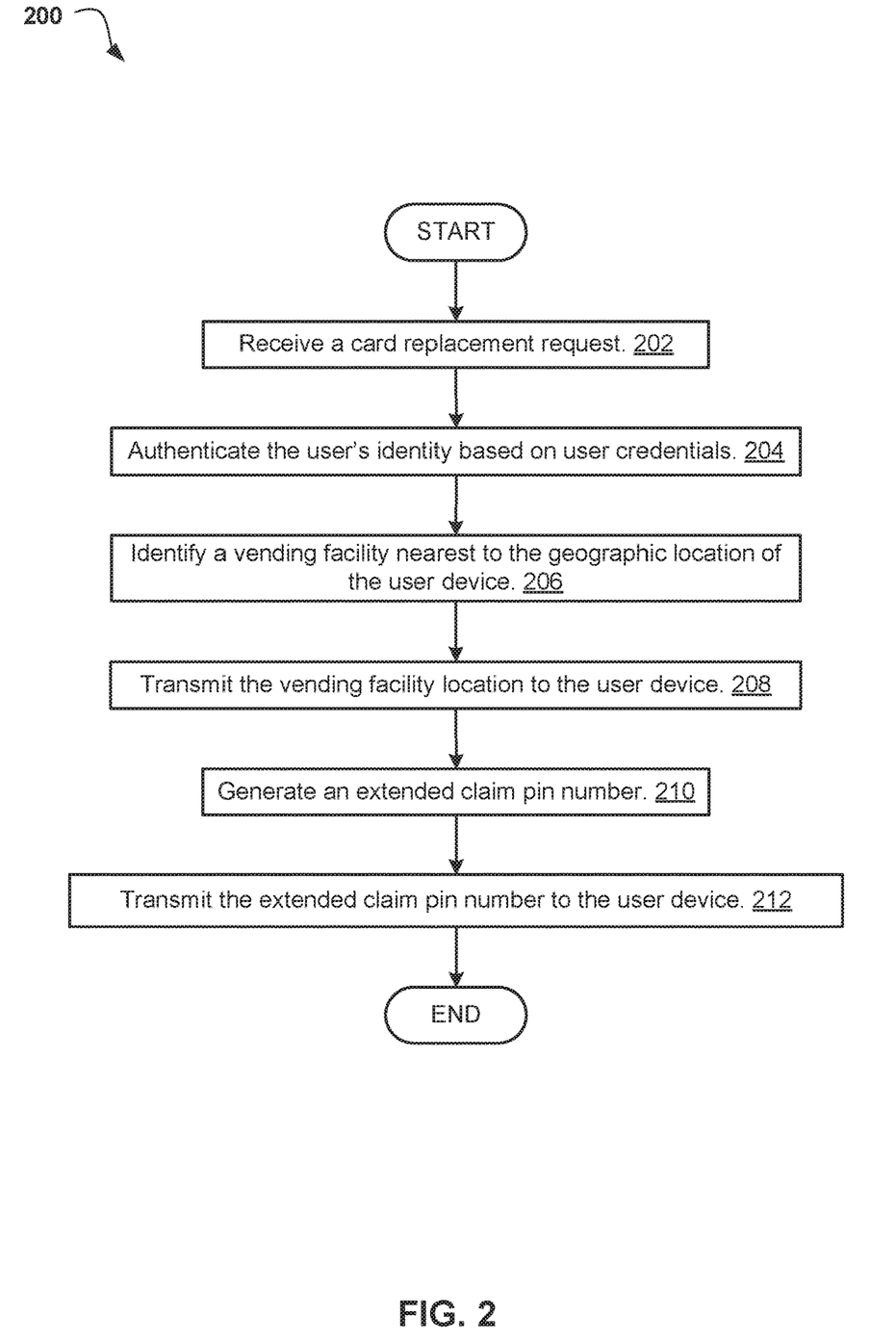
FIG. 2 is an operational flowchart illustrating a card replacement request process according to at least one embodiment.

Referring now to FIG. 2, an operational flowchart illustrating a card replacement request process 200 is depicted, according to at least one embodiment. At 202, the quick card replacement program 110A, 110C receives a card replacement request. When the user's card is lost, stolen, fraudulently compromised, or otherwise made unavailable to the user, the quick card replacement program 110A, 110C may receive the card replacement request from the user through various user request submissions. For example, the user may call a credit authorizer (e.g. credit card company) responsible for managing the user's card and request a replacement card. Similarly, the user may request a replacement card through a graphical user interface of a mobile application on the client computing device 102A.

Then, at 204, the quick card replacement program 110A, 110C authenticates the identity of the user based on submitted user credentials. The quick card replacement program 110A, 110C may utilize known authentication methods, such as passphrases, to authenticate the user's identity. For example, when the user submits a request for a replacement payment card, the quick card replacement program 110A, 110C may prompt the user to provide the correct answer to one or more preconfigured user identification questions, such as the user's mother's maiden name or the name of the user's first pet.

Next, at 206, the quick card replacement program 110A, 110C identifies a vending facility (e.g. client computing device 102B) within a preconfigured distance to the geographic location of the user device (e.g. client computing device 102A). Once the quick card replacement program 110A, 110C authenticates the user's identity, the quick card replacement program 110A, 110C may locate a vending facility, such as an automatic teller machine, nearest to the user's current geographic location that is capable of providing the user with a physical replacement payment card. The quick card replacement program 110A, 110C may utilize known global positioning system technology within the client computing device 102A to determine the current location of the nearest vending facility. In at least one embodiment, multiple vending facilities near the user's geographic location may be identified to allow the user to choose the desired vending facility to obtain a replacement physical payment card.

Then, at 208, the quick card replacement program 110A, 110C transmits the geographic location of the identified vending facility to the user device. Once the quick card replacement program 110A, 110C identifies the vending facility, the quick card replacement program 110A, 110C may transmit the location to the user device. The quick card replacement program 110A, 110C may then display the location of the identified vending facility on a map on the display screen of the client computing device 102A. In at least one embodiment, if the quick card replacement program 110A, 110C has identified multiple vending facilities within the preconfigured distance of the user device, the quick card replacement program 110A, 110C may display the identified vending facilities on the user device display screen and allow the user to select the preferred vending facility at which the user wishes to obtain the replacement physical payment card.

Next, at 210, the quick card replacement program 110A, 110C generates an extended claim pin number. The extended claim pin number may be a unique, single-use number for the user to redeem in exchange for the replacement physical payment card. The extended claim pin may be an alphanumeric sequence of characters of a preconfigured length generated by the quick card replacement program 110A, 110C once the user has submitted a card replacement request and been authenticated by the quick card replacement program 110A, 110C. For example, the quick card replacement program 110A, 110C may generate the extended claim pin of "1A2B3C" once a user has validated the user's identity using the known authentication techniques. In at least one embodiment, the quick card replacement program 110A, 110C may generate multiple extended claim pin numbers, only one of which may allow for the redemption of a replacement physical payment card. When a user comes within a threshold distance of a predetermined vending facility (e.g. the nearest automatic teller machine), the quick card replacement program 110A, 110C may present the extended claim pin number to the user. In another embodiment, the extended claim pin number may expire within a preconfigured period of time. For example, the user may be required to redeem the extended claim pin number within two hours of the extended claim pin number being transmitted to the user device.

Then, at 212, the quick card replacement program 110A, 110C transmits the extended claim pin number to the user device. Once generation of the extended claim pin number is complete, the quick card replacement program 110A, 110C may transmit the extended claim pin number to the user device so the user may be able to redeem the extended claim pin number for a replacement physical payment card. Furthermore, the quick card replacement program 110A, 110C may create an authorized claim record within a payment and authorization system 118 for subsequent retrieval and user verification of the card replacement request information needed when the user redeems the extended claim pin number at the vending facility.

Figure 3:
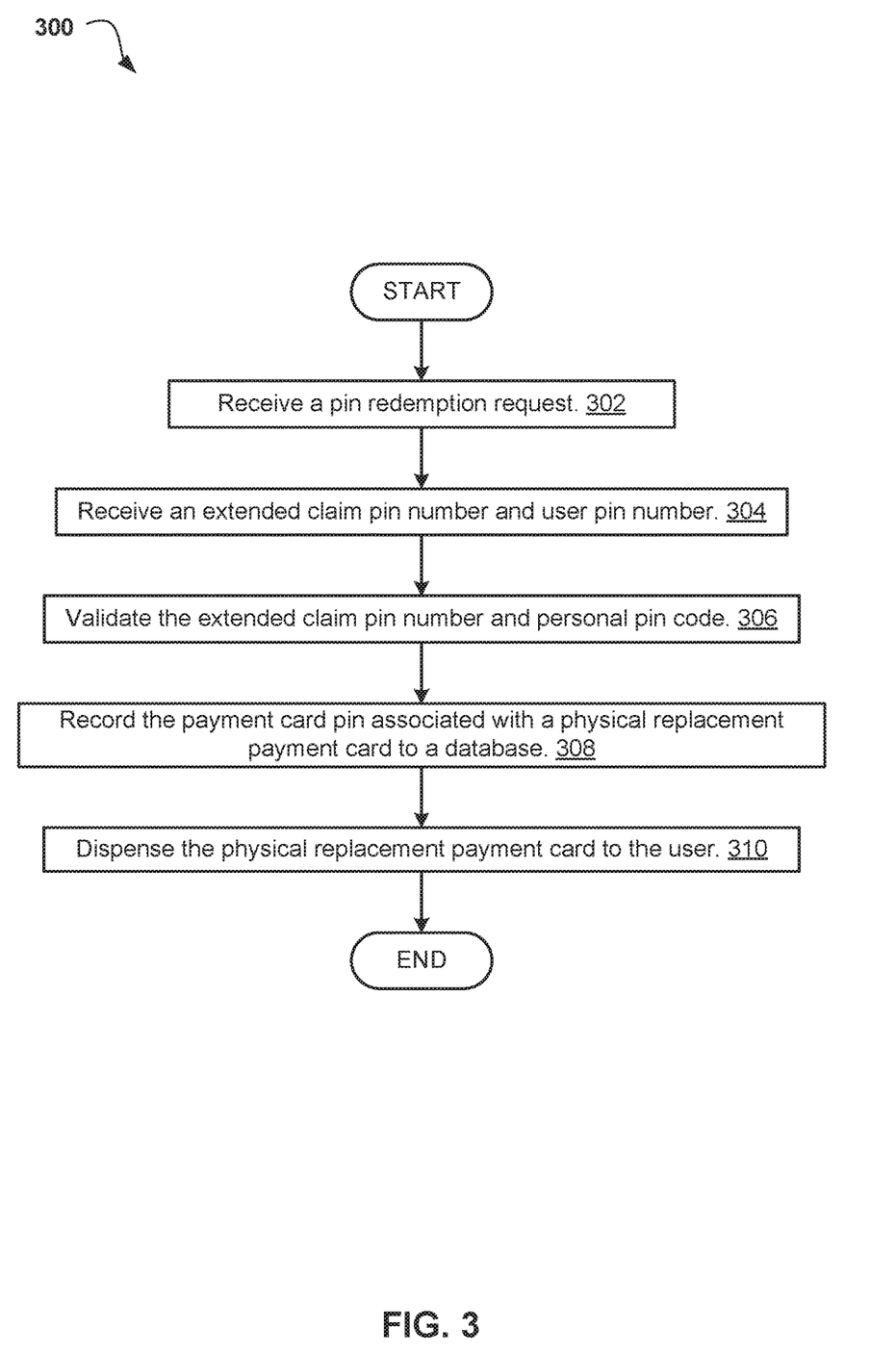
FIG. 3 is an operational flowchart illustrating a card replacement redemption process according to at least one embodiment.

Referring now to FIG. 3, an operational flowchart illustrating a card replacement redemption process 300 is depicted, according to at least one embodiment. At 302, the quick card replacement program 110B, 110C receives a pin redemption request. Once the user receives the location of the identified vending facility and the generated extended claim pin number, the user may proceed to the identified vending facility to redeem the generated extended claim pin number and receive a replacement payment card. Upon arriving at the identified vending facility, the user may submit a pin redemption request on the graphical user interface associated with the vending facility (i.e. client computing device 102B). The quick card replacement program 110B, 110C may receive the user-submitted pin redemption request in the vending facility.

Then, at 304, the quick card replacement program 110B, 110C receives an extended claim pin number and a personal code submitted by a user. Once the quick card replacement program 110B, 110C receives the pin redemption request, the quick card replacement program 110B, 110C may prompt the user to manually submit the extended claim pin number and the user's personal pin number as a validation of the user's identity. The user's personal pin number may be a preconfigured, user-specific alphanumeric code or phrase used to verify the user's identity. For example, if a user is attempting to receive a replacement debit card from an ATM, the user may submit the user's four-digit ATM pin number followed by the extended claim pin number the user received from the quick card replacement program 110A-C when placing the card replacement request during the card replacement request process 200. In at least one embodiment, the quick card replacement program 110B, 110C may receive the extended claim pin number through a radio frequency transmission from the user device to the vending facility.

Next, at 306, the quick card replacement program 110B, 110C validates the user-submitted extended claim pin number and the user pin code. The quick card replacement program 110B, 110C may validate the user-submitted extended claim pin and user pin code to determine the user's identity. The quick card replacement program 110B, 110C may use the extended claim pin as an index to identify the authorized claim record stored within the payment and authorization system 118. For example, the quick card replacement program 110B, 110C may search the payment and authorization system 118 for an authorized claim record when a user-submitted extended claim pin number is entered through a user interface or a graphical user interface associated with the vending facility. Once the authorized claim record is located within the payment and authorization system 118, the quick card replacement program 110B, 110C may compare the user information within the authorized claim record to the user information associated with the user-submitted pin number to verify the identity of the user submitting the redemption request.

Then, at 308, the quick card replacement program 110B, 110C records the payment card pin number associated with the physical replacement payment card in the database 116. Once the extended claim pin number is redeemed and the quick card replacement program 110B, 110C verifies the user information associated with the user's personal pin number and the authorized claim record match, the quick card replacement program 110B, 110C may record the pin number associated with the physical payment card within the vending facility. For example, if the user is requesting a replacement credit card from the vending facility, the quick card replacement program 110B, 110C may record the 16-digit number embossed on the surface of the replacement credit card. The pin number associated with the physical payment card may be recorded to the account associated with the user in the payment and authorization system 118 so transactions made with the replacement physical payment card may be associated with the user.

Next, at 310, the quick card replacement program 110B, 110C dispenses the replacement physical payment card to the user. Once the pin number associated with the replacement physical payment card has been recorded to the payment and authorization system 118 so the replacement physical payment card is associated with the user, the quick card replacement program 110B, 110C, via the vending facility, may dispense the replacement physical payment card to the user. For example, in the previous hypothetical, once the quick card replacement program 110B, 110C records the 16-digit credit card number to the user's account, the quick card replacement program 110B, 110C may dispense the replacement credit card from the vending facility into the user's possession.

Figure 4:
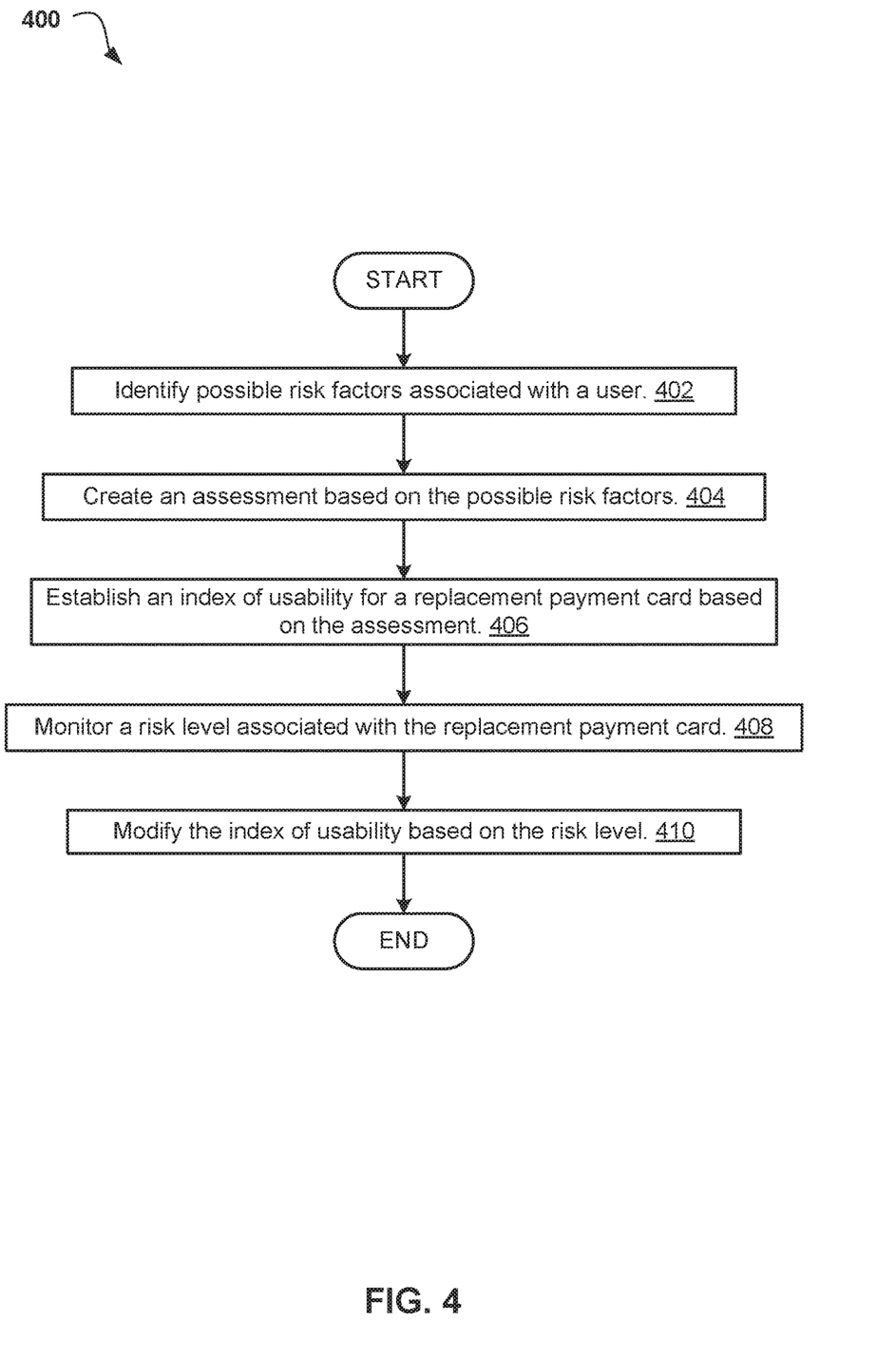
FIG. 4 is an operational flowchart illustrating an index of usability establishment process according to at least one embodiment.

Referring now to FIG. 4, an operational flowchart illustrating an index of usability establishment process 400 is depicted, according to at least one embodiment. At 402, when a user redeems the extended claim pin number at a vending facility, the quick card replacement program 110A-C identifies possible risk factors associated with the user. Depending on the risk factors surrounding the distribution of the replacement payment card, the quick card replacement program 110A-C may adjust the index of usability for the replacement payment card accordingly. For example, if the quick card replacement program 110A-C determines a high risk surrounding the distribution of the replacement payment card to the user, the quick card replacement program 110A-C may lower the index of usability of the replacement payment card so the user may only be able to purchase from specific vendors (e.g. gas stations or grocery stores). Possible risk factors the quick card replacement program 110A-C may consider are the cardholder's current location in relation to the cardholder's home location, whether the cardholder is requesting a replacement payment card due to fraudulent charges, the number of users associated with the payment card, and the types of goods or services typically purchased using the payment card (e.g. high priced items).

Then, at 404, the quick card replacement program 110A-C creates an assessment based on the possible risk factors associated with the user. Upon identifying the risk factors present when the user requests a replacement payment card, the quick card replacement program 110A-C may create an assessment based on all of the identified risk factors. The assessment may assign a low risk, moderate risk, or high risk to the replacement payment card based on the identified risk factors. For example, if the user is travelling on vacation when the replacement payment card is requested, the quick card replacement program 110A-C may determine a high risk exists when providing the user with a replacement payment card. Conversely, if the user is with a preconfigured distance from the user's home address, the quick card replacement program 110A-C may determine a low risk exist when providing the user with a replacement payment card.

Next, at 406, the quick card replacement program 110A-C establishes an index of usability for a replacement payment card based on the created assessment. The index of usability may a numerical value between 0 and 1 that correlates to the amount and nature of the items that may be allowed for purchase on the replacement payment card. For example, if the created assessment assigns a low risk to the distribution of the replacement payment card to the user, then the index of usability assigned to the replacement payment card may be close to 1 on the numerical scale and very few, if any, restrictions may be placed on the use of the replacement payment card. However, if the created assessment assigns a high risk to the distribution of the replacement payment card to the user, then the index of usability may be close to 0 on the numerical scale and many restrictions may be placed on the use of the replacement payment card, such as only permitting essential goods or services to be purchased or only purchases from a specific retailer. Furthermore, the quick card replacement program 110A-C may store the established index of usability within a data repository, such as database 116.

In at least one embodiment, if the replacement payment card is a temporary card to be utilized by the user, the index of usability may decay over time based on the assigned risk within the created assessment. For example, if the index of usability for a replacement payment card correlates to a moderate risk, the index of usability may initially be established at 0.3 on the numerical scale. However, two days after distribution of the replacement payment card, the index of usability may be recalculated to 0.6. The rate of decay of the index of usability may be based on the risk determined within the assessment.

In at least one other embodiment, the index of usability may be increased by an individual or organization serving as a guarantor of additional credit or available funds for the user. For example, if the index of usability is established at 0.6 on the numerical scale, the user may utilize a guarantor to decrease the index of usability to 0.3 thereby allowing the user to utilize the replacement payment card with fewer restrictions for a limited period of time. The index of usability may be increased either remotely or locally via a connection, such as the user placing a smartwatch within close proximity to a smartwatch belonging to the guarantor.

In yet another embodiment, the index of usability may be conveyed to the user through a colored icon on a display screen of a user device, such as client computing device 102A, 102B. For example, a spherical graphic displayed on a smartwatch may have an orange color to indicate to the user that the replacement payment card may only be used to buy essential items at specific stores or classes of stores. Furthermore, the index of usability may be displayed as the numerical value of the index of usability or as a color associated with the risk level used to establish the index of usability. For example, the numerical value 0.9 may be displayed on the display screen of the smartphone to convey the actual value of the index of usability to the user.

Then, at 408, the quick card replacement program 110A-C monitors the risk associated with the replacement payment card. The quick card replacement program 110A-C may monitor the risk associated with the replacement payment card by analyzing purchases made by the user and the user's geographic location. For example, the quick card replacement program 110A-C may monitor whether the user purchases a high priced item from a retailer not typically frequented by the user in a new geographic location.

Next, at 410, the quick card replacement program 110A-C modifies the index of usability based on the risk level. If the quick card replacement program 110A-C determines the risk associated with the replacement payment card exceeds a preconfigured maximum threshold, the quick card replacement program 110A-C may increase the value of the index of usability to match the determined risk. Therefore, more restrictions may be placed on the use of the replacement payment card. Additionally, if the quick card replacement program 110A-C determines the risk associated with the replacement payment card falls below a preconfigured minimum threshold, the quick card replacement program 110A-C may decrease the value of the index of usability to match the determined risk. Therefore, fewer restriction may be placed on the use of the replacement payment card.

Figure 5:
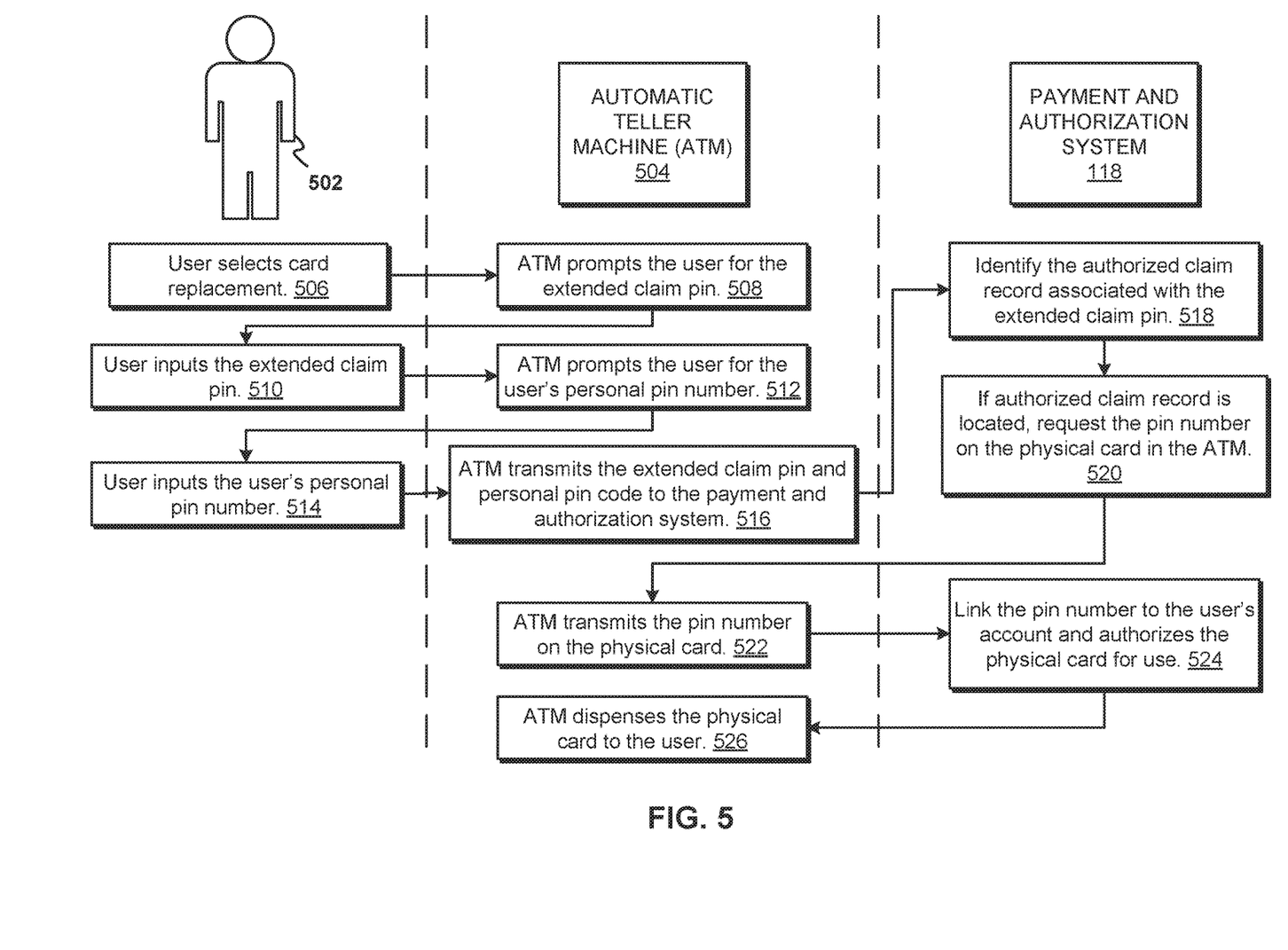
FIG. 5 is a block diagram of process steps executed by a user, an automatic teller machine, and a payment authorization system according to at least one embodiment.

Referring now to FIG. 5, a block diagram of process steps executed by a user 502, ATM 504, and a payment authorization system 118 is depicted, according to at least one embodiment. At 506, once the user 502 has obtained an extended claim pin from the management company of the payment card that the user 502 wishes to replace, the user 502 may select to receive a replacement payment card from a user interface on a vending facility, such as an ATM 504. Then, at 508, the ATM 504 may prompt the user 502 for the extended claim pin. Next, at 510, the user 502 may manually input the extended claim pin by interacting with the user interface or a dial pad associated with the ATM 504. Then, at 512, the ATM 504 may prompt the user 502 to enter a personal pin number specific to the user's account. For example, the user 502 may have a four-digit pin code that the user 502 may be required to enter upon executing a transaction at the ATM 504. Next, at 514, the user 502 manually input the personal pin number associated with the user's account. Then, at 516, the ATM 504 transmits the extended claim pin and the user's personal pin number to the payment and authorization system 118 in order to authenticate the user's credentials. Next, at 518, the payment and authorization system 118 may identify the authorized claim record associated with the card replacement request submitted by the user 502. Then, at 520, if the authorized claim record is located, the payment and authorization system 118 may request a pin code associated with the physical payment card within the ATM 504 that is to be dispensed to the user 502. For example, if the ATM 504 is issuing a replacement credit card to the user 502, the payment and authorization system 118 may request the 16-digit pin number embossed upon the surface of the replacement credit card. Next, at 522, the ATM 504 may transmit the pin number associated with the physical replacement card that is to be dispensed to the user 502 to the payment and authorization system 118. Then, at 524, the payment and authorization system 118 may link the transmitted pin number to the user's account and authorize the physical replacement payment card for use by the user 502. Next, at 526, once the replacement physical payment card has been link to the user's account, the ATM 504 may dispense the physical replacement payment card to the user 502.

It may be appreciated that FIGS. 2, 3, 4, and 5 provide only an illustration of one implementation and do not imply any limitations with regard to how different embodiments may be implemented. Many modifications to the depicted environments may be made based on design and implementation requirements.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
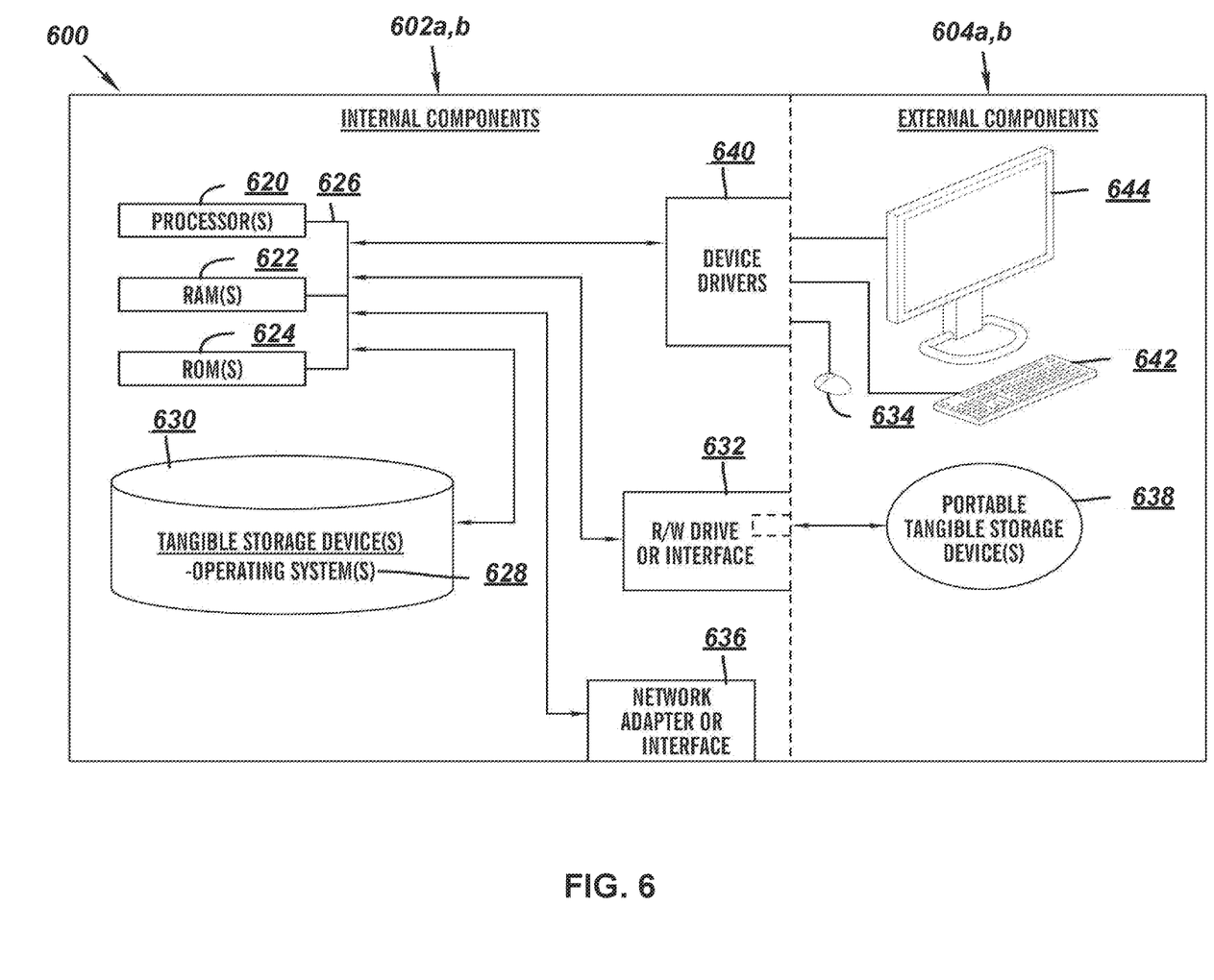
FIG. 6 is a block diagram of internal and external components of computers and servers depicted in FIG. 1 according to at least one embodiment.

FIG. 6 is a block diagram 600 of internal and external components of the client computing device 102A, 102B and the server 112 depicted in FIG. 1 in accordance with an embodiment of the present invention. It should be appreciated that FIG. 6 provides only an illustration of one implementation and does not imply any limitations with regard to the environments in which different embodiments may be implemented. Many modifications to the depicted environments may be made based on design and implementation requirements.

The data processing system 602, 604 is representative of any electronic device capable of executing machine-readable program instructions. The data processing system 602, 604 may be representative of a smart phone, a computer system, PDA, or other electronic devices. Examples of computing systems, environments, and/or configurations that may represented by the data processing system 602, 604 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102A, 102B and the server 112 may include respective sets of internal components 602 *a,b* and external components 604 *a,b* illustrated in FIG. 6. Each of the sets of internal components 602 include one or more processors 620, one or more computer-readable RAMs 622, and one or more computer-readable ROMs 624 on one or more buses 626, and one or more operating systems 628 and one or more computer-readable tangible storage devices 630. The one or more operating systems 628, the software program 108 and the quick card replacement program 110A in the client computing device 102A, the quick card replacement program 110B in the client computer 102B, and the quick card replacement program 110C in the server 112 are stored on one or more of the respective computer-readable tangible storage devices 630 for execution by one or more of the respective processors 620 via one or more of the respective RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Each set of internal components 602 a,b also includes a R/W drive or interface 632 to read from and write to one or more portable computer-readable tangible storage devices 638 such as a CD-ROM, DVD, memory stick, magnetic tape, magnetic disk, optical disk or semiconductor storage device. A software program, such as the quick card replacement program 110A-C, can be stored on one or more of the respective portable computer-readable tangible storage devices 638, read via the respective R/W drive or interface 632, and loaded into the respective hard drive 630.

Each set of internal components 602 a,b also includes network adapters or interfaces 636 such as a TCP/IP adapter cards, wireless Wi-Fi interface cards, or 3G or 4G wireless interface cards or other wired or wireless communication links. The software program 108 and the quick card replacement program 110A in the client computing device 102A, the quick card replacement program 110B in the client computing device 102B, and the quick card replacement program 110C in the server 112 can be downloaded to the client computing device 102A, 102B and the server 112 from an external computer via a network (for example, the Internet, a local area network or other, wide area network) and respective network adapters or interfaces 636. From the network adapters or interfaces 636, the software program 108 and quick card replacement program 110A in the client computing device 102A, the quick card replacement program 110B in the client computing device 102B, and the quick card replacement program 110C in the server 112 are loaded into the respective hard drive 630. The network may comprise copper wires, optical fibers, wireless transmission, routers, firewalls, switches, gateway computers and/or edge servers.

Each of the sets of external components 604 a,b can include a computer display monitor 644, a keyboard 642, and a computer mouse 634. External components 604 a,b can also include touch screens, virtual keyboards, touch pads, pointing devices, and other human interface devices. Each of the sets of internal components 602 a,b also includes device drivers 640 to interface to computer display monitor 644, keyboard 642, and computer mouse 634. The device drivers 640, R/W drive or interface 632, and network adapter or interface 636 comprise hardware and software (stored in storage device 630 and/or ROM 624).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
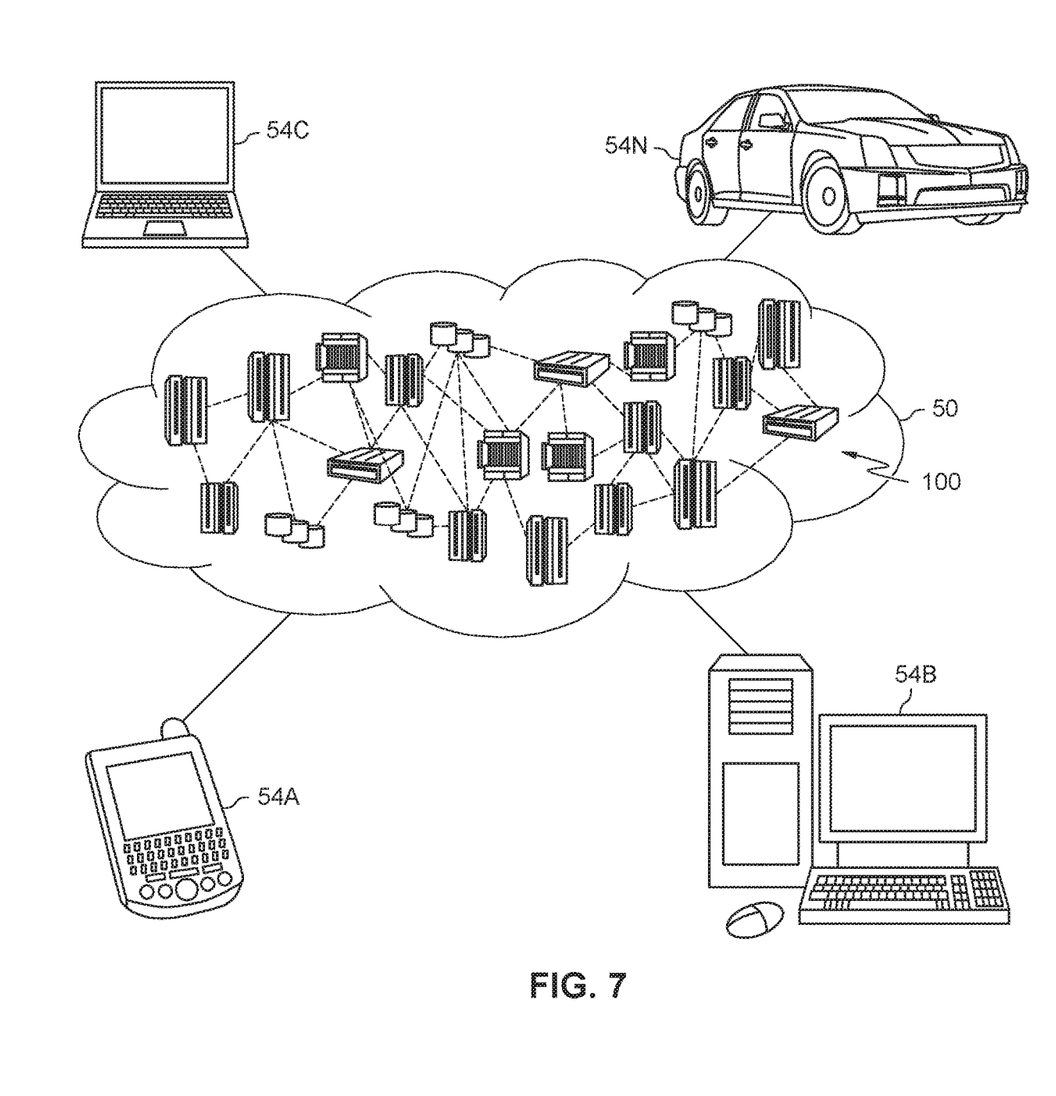
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 100 and cloud computing environment 50 can communicate with any type of computerized device over any type of network and/or network addressable connection (e.g., using a web browser).

Figure 8:
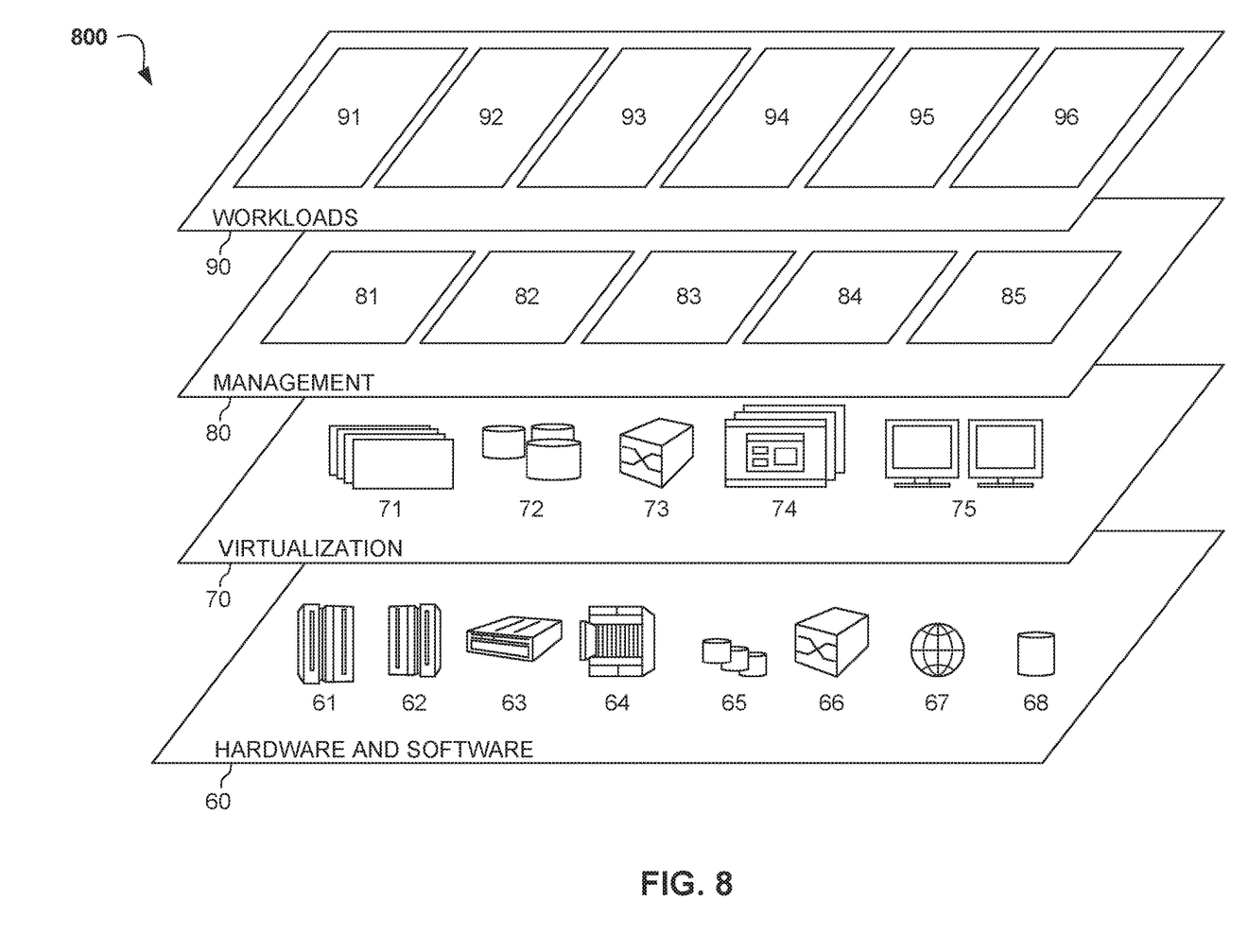
FIG. 8 depicts abstraction model layers according to an embodiment of the present invention.

Referring now to FIG. 8 a set of functional abstraction layers 800 provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and payment card replacement 96. Payment card replacement 96 may relate to validating a user's identity, providing the location of a nearby vending facility to the validated user, linking data associated with a physical replacement payment card to the validated user's account, and dispensing the physical replacement payment card from the vending facility to the user.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for replacing a physical payment card with a replacement physical payment card having an associated index of usability, the method comprising:

receiving, by a processor, a replacement physical payment card request in a vending facility;

identifying, by the processor, a plurality of risk factors associated with a user submitting the replacement physical payment card request;

creating, by the processor, a risk assessment based on the plurality of identified risk factors;

establishing, by the processor, an index of usability for the replacement physical payment card based on the created risk assessment, wherein a value of the index of usability correlates to a plurality of spending restrictions placed on a user purchase power with the replacement physical payment card, wherein the value of the index of usability decays over a period of time based on the risk assessment, wherein a high risk assessment correlates to a faster decay of the value of the index of usability, and wherein a low risk assessment correlates to a slower decay of the value of the index of usability;

storing, by the processor, the established index of usability in a database;

determining, by the processor, one or more spending restrictions based on the established index of usability associated with the user submitting the replacement physical payment card request; and dispensing a replacement physical payment card at the vending facility with the determined one or more spending restrictions based on the established index of usability associated with the user.

2. The method of claim 1, further comprising:

monitoring a risk level associated with the replacement physical payment card while the user utilizes the replacement physical payment card; and modifying the established index of usability based on the monitored risk level.

3. The method of claim 1, wherein the plurality of risk factors comprises a current location of the user in relation to a home location of the user, whether the replacement physical payment card was requested due to a plurality of fraudulent activity, at least one other user being associated with an account associated with the replacement physical payment card, and a type and a value of a plurality of goods or a plurality of services previously purchased using the replacement physical payment card.

4. The method of claim 1, wherein the created risk assessment assigns a risk level to the replacement physical payment card, and wherein the risk level is selected from a group consisting of a low risk level, a moderate risk level, and a high risk level.

5. The method of claim 1, wherein the index of usability is a numerical value between zero and one, and wherein, in response to the created risk assessment having a high risk level, the index of usability is a numerical value closer to zero than to one and a greater number of the plurality of spending restrictions are associated with the replacement physical payment card, and wherein, in response to the created risk assessment having a low risk level, the index of usability is a numerical value closer to one than to zero and a lower number of the plurality of spending restrictions are associated with the replacement physical payment card.

6. The method of claim 1, wherein the value of the index of usability is displayed on a display screen of a user device, and wherein the value of the index of usability is displayed as a numerical value or a color associated with a risk level associated with the created risk assessment.

7. The method of claim 1, further comprising:

generating a graphical user interface on a user device that displays an icon in a color associated with the value of the index of usability.

8. A computer system for replacing a physical payment card with a replacement physical payment card having an associated index of usability, the computer system comprising:

one or more processors, one or more computer-readable memories, one or more computer-readable tangible non-transitory storage medium, and program instructions stored on at least one of the one or more tangible non-transitory storage medium for execution by at least one of the one or more processors via at least one of the one or more memories, wherein the computer system is configured to:

receiving a replacement physical payment card request in a vending facility;

identifying a plurality of risk factors associated with a user submitting the replacement physical payment card request;

creating a risk assessment based on the plurality of identified risk factors;

establishing an index of usability for the replacement physical payment card based on the created risk assessment, wherein a value of the index of usability correlates to a plurality of spending restrictions placed on a user purchase power with the replacement physical payment card, wherein the value of the index of usability decays over a period of time based on the risk assessment, wherein a high risk assessment correlates to a faster decay of the value of the index of usability, and wherein a low risk assessment correlates to a slower decay of the value of the index of usability;

storing the established index of usability in a database;

determining one or more spending restrictions based on the established index of usability associated with the user submitting the replacement physical payment card request; and dispensing a replacement physical payment card at the vending facility with the determined one or more spending restrictions based on the established index of usability associated with the user.

9. The computer system of claim 8, further comprising:

monitoring a risk level associated with the replacement physical payment card while the user utilizes the replacement physical payment card; and modifying the established index of usability based on the monitored risk level.

10. The computer system of claim 8, wherein the plurality of risk factors comprises a current location of the user in relation to a home location of the user, whether the replacement physical payment card was requested due to a plurality of fraudulent activity, at least one other user being associated with an account associated with the replacement physical payment card, and a type and a value of a plurality of goods or a plurality of services previously purchased using the replacement physical payment card.

11. The computer system of claim 8, wherein the created risk assessment assigns a risk level to the replacement physical payment card, and wherein the risk level is selected from a group consisting of a low risk level, a moderate risk level, and a high risk level.

12. The computer system of claim 8, wherein the index of usability is a numerical value between zero and one, and wherein, in response to the created risk assessment having a high risk level, the index of usability is a numerical value closer to zero than to one and a greater number of the plurality of spending restrictions are associated with the replacement physical payment card, and wherein, in response to the created risk assessment having a low risk level, the index of usability is a numerical value closer to one than to zero and a lower number of the plurality spending of restrictions are associated with the replacement physical payment card.

13. The computer system of claim 8, further comprising:

generating a graphical user interface on a user device that displays an icon in a color associated with the value of the index of usability.

14. The computer system of claim 8, wherein the value of the index of usability is displayed on a display screen of a user device, and wherein the value of the index of usability is displayed as a numerical value or a color associated with a risk level associated with the created risk assessment.

15. A computer program product for replacing a physical payment card with a replacement physical payment card having an associated index of usability, the computer program product comprising one or more tangible non-transitory computer-readable storage media and program instructions stored on at least one of the one or more tangible non-transitory storage media, the program instructions executable by a processor, the program instructions comprising:
    program instructions to receive a replacement physical payment card request in a vending facility;
    program instructions to identify a plurality of risk factors associated with a user submitting the replacement physical payment card request;
    program instructions to create a risk assessment based on the a plurality of risk factors;
    program instructions to establish an index of usability for the replacement physical payment card based on the created risk assessment, wherein a value of the index of usability correlates to a plurality of spending restrictions placed on a user purchase power with the replacement physical payment card, wherein the value of the index of usability decays over a period of time based on the risk assessment, wherein a high risk assessment correlates to a faster decay of the value of the index of usability, and wherein a low risk assessment correlates to a slower decay of the value of the index of usability;
    program instructions to store the established index of usability in a database;
    program instructions to determine one or more spending restrictions based on the established index of usability associated with the user submitting the replacement physical payment card request; and
    program instructions to dispense a replacement physical payment card at the vending facility with the determined one or more spending restrictions based on the established index of usability associated with the user.

16. The computer program product of claim 15, further comprising:
    program instructions to monitor a risk level associated with the replacement physical payment card while the user utilizes the replacement physical payment card; and
    program instructions to modify the established index of usability based on the monitored risk level.

17. The computer program product of claim 15, wherein the plurality of risk factors comprises a current location of the user in relation to a home location of the user, whether the replacement physical payment card was requested due to a plurality of fraudulent activity, at least one other user being associated with an account associated with the replacement physical payment card, and a type and a value of a plurality of goods or a plurality of services previously purchased using the replacement physical payment card.

18. The computer program product of claim 15, wherein the created risk assessment assigns a risk level to the replacement physical payment card, and wherein the risk level is selected from a group consisting of a low risk level, a moderate risk level, and a high risk level.

19. The computer program product of claim 15, wherein the index of usability is a numerical value between zero and one, and wherein, in response to the created risk assessment having a high risk level, the index of usability is a numerical value closer to zero than to one and a greater number of the plurality of spending restrictions are associated with the replacement physical payment card, and wherein, in response to the created risk assessment having a low risk level, the index of usability is a numerical value closer to one than to zero and a lower number of the plurality of spending restrictions are associated with the replacement physical payment card.

20. The computer program product of claim 15, further comprising:
    generating a graphical user interface on a user device that displays an icon in a color associated with the value of the index of usability.

\* \* \* \* \*